A

United States Patent
Cui et al.

(10) Patent No.: US 10,149,193 B2
(45) Date of Patent: Dec. 4, 2018

(54) METHOD AND APPARATUS FOR DYNAMICALLY MANAGING NETWORK RESOURCES

(71) Applicant: AT&T INTELLECTUAL PROPERTY I, LP, Atlanta, GA (US)

(72) Inventors: Zhi Cui, Sugar Hill, GA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 173 days.

(21) Appl. No.: 15/183,609

(22) Filed: Jun. 15, 2016

(65) Prior Publication Data

US 2017/0367081 A1    Dec. 21, 2017

(51) Int. Cl.
*H04W 72/04*    (2009.01)
*H04W 28/02*    (2009.01)
*H04W 24/02*    (2009.01)

(52) U.S. Cl.
CPC ........ *H04W 28/0231* (2013.01); *H04W 24/02* (2013.01)

(58) Field of Classification Search
CPC .............. H04W 16/10; H04W 72/1257; H04L 41/5012
See application file for complete search history.

(56) References Cited

U.S. PATENT DOCUMENTS

| 4,285,469 A | 8/1981 | Huang |
| 5,671,253 A | 9/1997 | Stewart |
| 5,970,408 A | 10/1999 | Carlsson et al. |

(Continued)

FOREIGN PATENT DOCUMENTS

| CN | 102045896 A | 5/2011 |
| CN | 105052074 | 2/2014 |

(Continued)

OTHER PUBLICATIONS

Akyildiz, Ian F. et al., "A roadmap for traffic engineering in SDN-OpenFlow networks", Computer Networks 71, 2014, 1-30.

(Continued)

*Primary Examiner* — David Oveissi
(74) *Attorney, Agent, or Firm* — Guntin & Gust, PLC; Matthew Tropper

(57) ABSTRACT

Aspects of the subject disclosure may include, for example, a method for receiving a first target allocation of a radio access network resource of a radio access network of a communication network, transmitting first configuration information to the radio access network to configure the radio access network according to the first target allocation, receiving from the radio access network a first utilization of the first portion of the capacity of the radio access network resource, comparing the first utilization to a first utilization threshold responsive to receiving the first utilization from the radio access network, determining an adjustment of the first target allocation of the radio network resource according to the comparing of the first utilization to the first utilization threshold, and transmitting second configuration information to the radio access network to re-configure the radio access network according to the adjustment of the first target allocation of the radio network resource. Other embodiments are disclosed.

20 Claims, 8 Drawing Sheets

(56) References Cited

U.S. PATENT DOCUMENTS

| | | |
|---|---|---|
| 6,246,883 B1 | 6/2001 | Lee |
| 6,795,686 B2 | 9/2004 | Master et al. |
| 6,873,620 B1 | 3/2005 | Coveley et al. |
| 7,167,923 B2 | 1/2007 | Lo et al. |
| 7,206,294 B2 | 4/2007 | Garahi et al. |
| 7,486,678 B1 | 2/2009 | Devanagondi et al. |
| 7,532,640 B2 | 5/2009 | Kelly et al. |
| 7,660,583 B2 | 2/2010 | Pekonen et al. |
| 7,787,414 B2 | 8/2010 | Le Faucheur et al. |
| 8,145,208 B2 | 3/2012 | Chari et al. |
| 8,234,650 B1 | 7/2012 | Eppstein et al. |
| 8,385,977 B2 | 2/2013 | Fein et al. |
| 8,593,968 B2 | 11/2013 | Santiago et al. |
| 8,621,058 B2 | 12/2013 | Eswaran et al. |
| 8,676,219 B2 | 3/2014 | Lennvall et al. |
| 8,868,069 B2 | 10/2014 | Bennett et al. |
| 9,077,478 B1 | 7/2015 | Schmidtke et al. |
| 9,078,284 B2 | 7/2015 | Richardson |
| 9,119,016 B2 | 8/2015 | Durand et al. |
| 9,225,587 B2 | 12/2015 | Zhang et al. |
| 9,225,652 B2 | 12/2015 | Li et al. |
| 9,245,246 B2 | 1/2016 | Breitgand et al. |
| 9,270,815 B2 | 2/2016 | Shaw et al. |
| 9,298,515 B2 | 3/2016 | McMurry et al. |
| 9,301,333 B2 | 3/2016 | Choi et al. |
| 9,305,301 B2 | 4/2016 | Paul et al. |
| 9,306,909 B2 | 4/2016 | Koponen et al. |
| 9,311,108 B2 | 4/2016 | Cummings |
| 9,330,156 B2 | 5/2016 | Satapathy |
| 9,369,390 B2 | 6/2016 | Bantukul et al. |
| 9,378,043 B1 | 6/2016 | Chen et al. |
| 9,384,028 B1 | 7/2016 | Felstaine et al. |
| 9,391,897 B2 | 7/2016 | Sparks et al. |
| 9,392,471 B1 | 7/2016 | Thomas et al. |
| 9,401,962 B2 | 7/2016 | Parker et al. |
| 9,407,542 B2 | 8/2016 | Vasseur et al. |
| 9,436,443 B2 | 9/2016 | Chiosi et al. |
| 9,445,341 B2 | 9/2016 | Spinelli et al. |
| 9,450,823 B2 | 9/2016 | Rhee et al. |
| 9,461,729 B2 | 10/2016 | Djukic et al. |
| 9,497,572 B2 | 11/2016 | Britt et al. |
| 9,503,969 B1 | 11/2016 | Zakaria et al. |
| 9,544,120 B2 | 1/2017 | Scholten et al. |
| 9,559,980 B2 | 1/2017 | Li et al. |
| 9,565,074 B2 | 2/2017 | Lehane et al. |
| 9,602,422 B2 | 3/2017 | Padmanabhan et al. |
| 2003/0145106 A1 | 7/2003 | Brown et al. |
| 2004/0103308 A1 | 5/2004 | Paller et al. |
| 2006/0029097 A1 | 2/2006 | McGee et al. |
| 2007/0140269 A1 | 6/2007 | Donnelli et al. |
| 2008/0285492 A1 | 11/2008 | Vesterinen et al. |
| 2010/0234071 A1 | 9/2010 | Shabtay et al. |
| 2011/0182227 A1 | 7/2011 | Rune et al. |
| 2011/0282931 A1 | 11/2011 | Chen et al. |
| 2012/0140749 A1 | 6/2012 | Caldwell et al. |
| 2012/0303828 A1 | 11/2012 | Young et al. |
| 2013/0010756 A1 | 1/2013 | Liang et al. |
| 2013/0046665 A1 | 2/2013 | Zabawskyj et al. |
| 2013/0072199 A1 | 3/2013 | Miyagawa et al. |
| 2013/0337872 A1 | 12/2013 | Fertl et al. |
| 2014/0023044 A1 | 1/2014 | Sjölinder et al. |
| 2014/0070892 A1 | 3/2014 | Matsuoka et al. |
| 2014/0254382 A1 | 9/2014 | Randriamasy et al. |
| 2014/0259012 A1 | 9/2014 | Nandlall et al. |
| 2014/0269435 A1 | 9/2014 | McConnell et al. |
| 2014/0301192 A1 | 10/2014 | Lee et al. |
| 2014/0307556 A1 | 10/2014 | Zhang et al. |
| 2014/0349611 A1 | 11/2014 | Kant et al. |
| 2014/0376454 A1 | 12/2014 | Boudreau et al. |
| 2014/0376555 A1 | 12/2014 | Choi et al. |
| 2015/0055623 A1 | 2/2015 | Li |
| 2015/0063166 A1 | 3/2015 | Sif et al. |
| 2015/0067676 A1 | 3/2015 | Madani et al. |
| 2015/0109967 A1 | 4/2015 | Hogan et al. |
| 2015/0113100 A1 | 4/2015 | Tweedale et al. |
| 2015/0139238 A1 | 5/2015 | Pourzandi et al. |
| 2015/0154258 A1 | 6/2015 | Xiong et al. |
| 2015/0163159 A1 | 6/2015 | DeCusatis et al. |
| 2015/0172115 A1 | 6/2015 | Nguyen et al. |
| 2015/0257012 A1 | 9/2015 | Zhang |
| 2015/0257038 A1 | 9/2015 | Scherzer |
| 2015/0295833 A1 | 10/2015 | Mizukoshi et al. |
| 2015/0304281 A1 | 10/2015 | Kasturi et al. |
| 2015/0319078 A1 | 11/2015 | Lee et al. |
| 2015/0350102 A1 | 12/2015 | Leon-Garcia et al. |
| 2015/0358236 A1 | 12/2015 | Roach et al. |
| 2015/0363219 A1 | 12/2015 | Kasturi et al. |
| 2015/0378753 A1 | 12/2015 | Phillips et al. |
| 2015/0382278 A1 | 12/2015 | Fallon et al. |
| 2016/0014787 A1 | 1/2016 | Zhang et al. |
| 2016/0021588 A1 | 1/2016 | Kamdar et al. |
| 2016/0044136 A1 | 2/2016 | Schiff et al. |
| 2016/0073278 A1* | 3/2016 | Roessler ............ H04L 49/70 370/252 |
| 2016/0080484 A1 | 3/2016 | Earl |
| 2016/0088092 A1 | 3/2016 | Cardona-Gonzalez et al. |
| 2016/0094255 A1 | 3/2016 | Meredith et al. |
| 2016/0094395 A1 | 3/2016 | Hu |
| 2016/0094641 A1 | 3/2016 | Rahman et al. |
| 2016/0094668 A1 | 3/2016 | Chang et al. |
| 2016/0095019 A1 | 3/2016 | Cui et al. |
| 2016/0095042 A1 | 3/2016 | Wadhwa |
| 2016/0105821 A1 | 4/2016 | Senarath et al. |
| 2016/0105893 A1 | 4/2016 | Senarath et al. |
| 2016/0112327 A1 | 4/2016 | Morris et al. |
| 2016/0112335 A1 | 4/2016 | Bouanen et al. |
| 2016/0112903 A1 | 4/2016 | Kaushik et al. |
| 2016/0113018 A1 | 4/2016 | Li |
| 2016/0127169 A1 | 5/2016 | Bull et al. |
| 2016/0127230 A1 | 5/2016 | Cui et al. |
| 2016/0127239 A1 | 5/2016 | Kahn et al. |
| 2016/0142282 A1 | 5/2016 | Guo |
| 2016/0150421 A1 | 5/2016 | Li et al. |
| 2016/0150448 A1 | 5/2016 | Perras et al. |
| 2016/0156513 A1 | 6/2016 | Zhang et al. |
| 2016/0164787 A1 | 6/2016 | Roach et al. |
| 2016/0212017 A1 | 7/2016 | Li et al. |
| 2016/0218948 A1 | 7/2016 | Djukic |
| 2016/0218971 A1 | 7/2016 | Basunov |
| 2016/0219076 A1 | 7/2016 | Paczkowski et al. |
| 2016/0234730 A1 | 8/2016 | John et al. |
| 2016/0248860 A1 | 8/2016 | Dunbar et al. |
| 2016/0249353 A1 | 8/2016 | Nakata et al. |
| 2016/0262044 A1 | 9/2016 | Calin et al. |
| 2016/0286043 A1 | 9/2016 | John et al. |
| 2016/0294732 A1 | 10/2016 | Chou et al. |
| 2016/0294734 A1 | 10/2016 | Jang et al. |
| 2016/0295614 A1 | 10/2016 | Lee et al. |
| 2016/0301566 A1 | 10/2016 | Ramasubramani et al. |
| 2016/0352645 A1 | 12/2016 | Senarath et al. |
| 2016/0352924 A1 | 12/2016 | Senarath et al. |
| 2016/0353268 A1 | 12/2016 | Senarath et al. |
| 2016/0353367 A1 | 12/2016 | Vrzic et al. |
| 2016/0353422 A1 | 12/2016 | Vrzic et al. |
| 2016/0353465 A1 | 12/2016 | Vrzic et al. |
| 2016/0359682 A1 | 12/2016 | Senarath et al. |
| 2016/0373372 A1 | 12/2016 | Gillon et al. |
| 2016/0381146 A1 | 12/2016 | Zhang et al. |
| 2016/0381528 A1 | 12/2016 | Lee et al. |
| 2016/0381662 A1 | 12/2016 | Wang |
| 2017/0005390 A1 | 1/2017 | Zakaria et al. |
| 2017/0026887 A1 | 1/2017 | Sirotkin et al. |
| 2017/0034761 A1 | 2/2017 | Narayanan |
| 2017/0054595 A1 | 2/2017 | Zhang et al. |
| 2017/0064591 A1 | 3/2017 | Padfield et al. |
| 2017/0064666 A1 | 3/2017 | Zhang |
| 2017/0070892 A1 | 3/2017 | Song et al. |
| 2017/0078183 A1 | 3/2017 | Civanlar et al. |
| 2017/0079059 A1 | 3/2017 | Li et al. |
| 2017/0085493 A1 | 3/2017 | Senarath et al. |
| 2017/0086049 A1 | 3/2017 | Vrzic |
| 2017/0086111 A1 | 3/2017 | Vrzic et al. |
| 2017/0086118 A1 | 3/2017 | Vrzic |
| 2017/0104688 A1 | 4/2017 | Mirahsan et al. |

(56) References Cited

U.S. PATENT DOCUMENTS

| | | | |
|---|---|---|---|
| 2017/0141973 | A1 | 5/2017 | Vrzic |
| 2017/0142591 | A1 | 5/2017 | Vrzic et al. |
| 2017/0150399 | A1 | 5/2017 | Venkatachalam et al. |
| 2017/0164187 | A1 | 6/2017 | Lu |
| 2017/0164212 | A1 | 6/2017 | Opsenica et al. |
| 2017/0164349 | A1 | 6/2017 | Zhu et al. |
| 2017/0164419 | A1 | 6/2017 | Kim |
| 2017/0257276 | A1 | 9/2017 | Chou et al. |
| 2017/0272978 | A1 | 9/2017 | Giloh et al. |
| 2017/0302369 | A1 | 10/2017 | Kwoczek et al. |
| 2017/0303189 | A1 | 10/2017 | Hampel et al. |
| 2017/0318468 | A1* | 11/2017 | Aijaz ............... H04W 16/10 |
| 2017/0339567 | A1 | 11/2017 | Li et al. |
| 2018/0131578 | A1 | 5/2018 | Cui et al. |

FOREIGN PATENT DOCUMENTS

| | | |
|---|---|---|
| CN | 104955172 | 3/2014 |
| CN | 105516312 A | 4/2016 |
| CN | 105979542 A | 9/2016 |
| CN | 106257944 A | 12/2016 |
| EP | 2955631 | 12/2015 |
| JP | 5656803 B2 | 1/2015 |
| KR | 101328344 B1 | 11/2013 |
| KR | 20150132774 | 5/2014 |
| KR | 101531834 | 9/2014 |
| KR | 1473783 | 12/2014 |
| WO | 2000067449 | 11/2000 |
| WO | 2014071084 A2 | 5/2014 |
| WO | 2015031512 A1 | 3/2015 |
| WO | 015057960 | 4/2015 |
| WO | 2015057960 A1 | 4/2015 |
| WO | 2015103297 | 7/2015 |
| WO | 2015198087 A1 | 12/2015 |
| WO | 2016051237 | 4/2016 |
| WO | 2016126238 A1 | 8/2016 |
| WO | 2016126347 A1 | 8/2016 |
| WO | 2016141518 A1 | 9/2016 |
| WO | 2016162467 A1 | 10/2016 |
| WO | 2016192639 A1 | 12/2016 |
| WO | 2016206372 A1 | 12/2016 |
| WO | 2017011827 A1 | 1/2017 |
| WO | 2017023196 | 2/2017 |
| WO | 2017044151 A1 | 3/2017 |
| WO | 2017044153 | 3/2017 |
| WO | 2017054841 | 4/2017 |
| WO | 2017057025 A1 | 4/2017 |
| WO | 2017058067 | 4/2017 |
| WO | 2017071228 | 5/2017 |
| WO | 2017074486 A1 | 5/2017 |
| WO | 2017078770 | 5/2017 |
| WO | 2017119844 | 7/2017 |
| WO | 2017123045 A1 | 7/2017 |
| WO | 2017124003 A1 | 7/2017 |

OTHER PUBLICATIONS

Chen, Xu , "Intelligence on Optical Transport SDN", International Journal of Computer and Communication Engineering 4.1: 5., 2015.
Hakiri, Akram et al., "Leveraging SDN for the 5G Networks: Trends, Prospects and Challenges", arXiv preprint arXiv:1506.02876, 2015.
Nguyen, Van-Giang et al., "SDN and virtualization-based LTE mobile network architectures: A comprehensive survey", Wireless Personal Communications 86.3, 2016, 1401-1438.
"Cell Site on Light Trucks", 2007, 1 page.
"Dynamic end-to-end network slicing for 5G", White Paper, https://resources.ext.nokia.com/asset/200339, 2016, 1-10.
"Network Slicing", ericsson.com, Apr. 12, 2017.
"Network Slicing for 5G Networks and Services", 5G Americas™, 5gamericas.org, Nov. 2016.
"The Edge of the Cloud 5G Technology Blog", edgeofcloud.blogspot.com, TechBlogger, pen, Apr. 8, 2017.
Akyildiz, Ian, "Wireless software-defined networks (W-SDNs) and network function virtualization (NFV) for 5G cellular systems: An overview and qualitative evaluation", 2015, 14 pages.
Biral, Andrea et al., "The Challenges of M2M Massive Access in Wireless Cellular Networks", Department of Information Engineering of the University of Padova, Mar. 27, 2015, 1-19.
Bor-Yaliniz, et al., "The new frontier in RAN heterogeneity: Multi-tier drone-cells", 2016, 9 pages.
Datta, Soumya K. et al., "Smart M2M Gateway Based Architecture for M2M Device and Endpoint Management", Internet of Things (iThings), 2014 IEEE International Conference on, and Green Computing and Communications (GreenCom), IEEE and Cyber, Physical and Social Computing (CPSCom), IEEE. IEEE, 2014., 2014, 1-8.
Deak, Gabriel et al., "IOT (Internet of Things) and DFPL (Device-Free Passive Localisation) in a Disaster Management Scenario", Internet of Things (WF-IoT), 2015 IEEE 2nd World Forum on. IEEE, 2015., Aug. 2, 2012, 1-15.
Dhekne, et al., "Extending Cell Tower Coverage through Drones", 2017, 6 pages.
Ghavimi, Fayezeh et al., "M2M Communications in 3GPP LTE/LTE-A Networks: Architectures, Service Requirements, Challenges, and Applications", IEEE.
Communication Surveys & Tutorials, vol. 17, No. 2, Second Quarter 2015, May 9, 2015, 525-549.
Gramaglia, Marco et al., "Flexible connectivity and QoE/QoS management for 5G Networks: The 5G NORMA view", Communications Workshops (ICC), 2016 IEEE International Conference on. IEEE.
Hakiri, et al., "Leveraging SDN for the 5G Networks: Trends, Prospects and Challenges", 2015, 23 pages.
Inam, et al., "Towards automated service-oriented lifecycle management for 5G networks", 2015, 8 pages.
Katsalis, et al., "5g architectural design patterns", 2016, 7 pages.
Le, Long B., "Enabling 5G Mobile Wireless Technologies", EURASIP Journal on Wireless Communications and Networking 2015.1 (2015): 218., 2015, 1-14.
McCullough, Don, "Why 5G Network Slices?", ericsson.com, Feb. 17, 2015.
Nikaein, Navid et al., "Network store: Exploring slicing in future 5g networks", Proceedings of the 10th International Workshop on Mobility in the Evolving Internet Architecture, ACM, 2015.
Novo, Oscar et al., "Capillary Networks—Bridging the Cellular and IoT Worlds", Internet of Things (WF-IoT), 2015 IEEE 2nd World Forum on. IEEE, 2015., 2015, 1-8.
Open Networking Foundation, "TR-526 Applying SDN Architecture to 5G Slicing", Issue 1, Apr. 2016, 1-19.
Podleski, Lukasz et al., "Multi-domain Software Defined Network: exploring possibilities in", TNC, 2014.
Sayadi, Bessem et al., "SDN for 5G Mobile Networks: NORMA Perspective", International Conference on Cognitive Radio Oriented Wireless Networks, Springer International Publishing, 2016.

* cited by examiner

200

METHOD AND APPARATUS FOR DYNAMICALLY MANAGING NETWORK RESOURCES

FIELD OF THE DISCLOSURE

The subject disclosure relates to a method and apparatus for dynamically managing network resources.

BACKGROUND

Communication systems, such as a mobile communications system, can be used for providing various services, including voice, video and/or data services, and user location information can be important for next generation IP multi-media services provided by telecommunication systems. As the number of users and their service requirements increase, the load on the network increases. Infrastructure expansion and improvement can lessen the network load but is costly.

BRIEF DESCRIPTION OF THE DRAWINGS

Reference will now be made to the accompanying drawings, which are not necessarily drawn to scale, and wherein.

DETAILED DESCRIPTION

Figure 1:
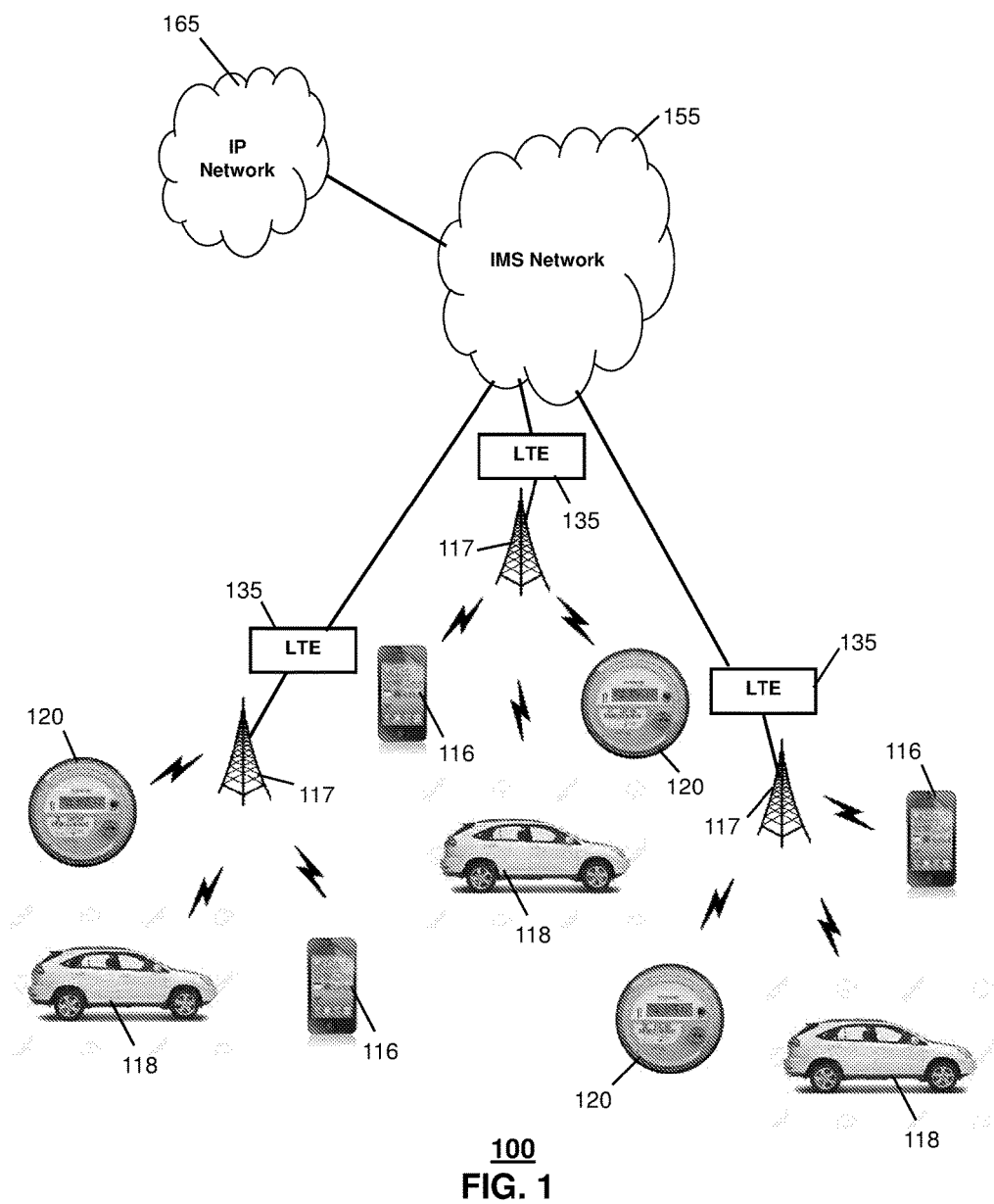
FIG. 1 depicts an illustrative embodiment of a system that can be utilized for managing network resources in a wireless communication network.

The subject disclosure describes, among other things, illustrative embodiments for dynamically managing network resources in a communication system. A software defined network (SDN) can be used to configure network resources, such as radio access network (RAN) resources to provide several different services having different types of characteristics and requirements. For example, the SDN can configure RAN resources to support mobile communication wireless devices, vehicle-based wireless services, and/or Internet of Things (IoT) stationary wireless services. The SDN can effectively slice, or distribute portions of, the available RAN capacity between these services. The SDN can further monitor the how system demands affect the utilization of the capacity, as sliced, for providing the services and compare the utilizations against thresholds established by a control, orchestrator, management, and policy server (COMP). The SDN can dynamically modify the configuration of the RAN resources to dynamically respond to the current utilization demands. Other embodiments are described in the subject disclosure.

One or more aspects of the subject disclosure include a device including a processing system including a processor and a memory that stores executable instructions that, when executed by the processor, facilitate performance of operations, including receiving from a policy server a first target allocation of a radio access network resource of a radio access network of a communication network. The first target allocation can assign a first portion of capacity of the radio access network resource for providing a first communication service and a second portion of the capacity of the radio access network resource for providing a second communication service. The operations can include transmitting first configuration information to the radio access network to configure the radio access network according to the first target allocation. The operations can also include comparing the first utilization to a first utilization threshold responsive to receiving the first utilization from the radio access network and comparing the second utilization to a second utilization threshold responsive to receiving the second utilization from the radio access network. The operations can further include determining an adjustment of the first target allocation of the radio network resource according to the comparing of the first utilization to the first utilization threshold and comparing the second utilization to the second utilization threshold. The adjustment can include reassigning a first part of the second portion of the capacity of the radio access network resource to the first portion of the capacity. The reassigning can cause the first utilization of the first portion of the capacity to fall below the first threshold. The operations can include transmitting second configuration information to the radio access network to reconfigure the radio access network according to the adjustment of the first target allocation of the radio network resource.

One or more aspects of the subject disclosure include a method, including receiving, from a policy server, by a processing system comprising a processor, a first target allocation of a radio access network resource of a radio access network of a communication network. The first target allocation can assign a first portion of capacity of the radio access network resource for providing a first communication service and a second portion of the capacity of the radio access network resource for providing a second communication service. The method can include transmitting, by the processing system, first configuration information to the radio access network to configure the radio access network according to the first target allocation. The method can also include receiving, by the processing system, from the policy server a first utilization threshold of the first portion of the capacity of the radio access network resource. The method can further include receiving, by the processing system, from the radio access network a first utilization of the first portion of the capacity of the radio access network resource and, in turn, comparing, by the processing system, the first utilization to the first utilization threshold responsive to receiving the first utilization from the radio access network. The method can include determining, by the processing system, an adjustment of the first target allocation of the radio network resource according to the comparing of the first utilization to the first utilization threshold. The adjustment can include reassigning a first part of the second portion of the capacity of the radio access network resource to the first portion of the capacity. The reassigning can cause the first utilization of the first portion of the capacity to fall below the first threshold. The method can further include transmitting, by the processing system, second configuration information to the radio access network to re-configure the radio access network according to the adjustment of the first target allocation of the radio network resource.

One or more aspects of the subject disclosure include a machine-readable storage medium, comprising executable instructions that, when executed by a processing system including a processor, facilitate performance of operations, including receiving a first target allocation of a radio access network resource of a radio access network of a communication network, wherein the first target allocation assigns a first portion of capacity of the radio access network resource for providing a first communication service. The operations can include transmitting first configuration information to the radio access network to configure the radio access network according to the first target allocation. The operations can also include receiving from the radio access network a first utilization of the first portion of the capacity of the radio access network resource and, in turn, comparing the first utilization to a first utilization threshold responsive to receiving the first utilization from the radio access network. The method can further include determining an adjustment of the first target allocation of the radio network resource according to the comparing of the first utilization to the first utilization threshold and, in turn, transmitting second configuration information to the radio access network to re-configure the radio access network according to the adjustment of the first target allocation of the radio network resource.

FIG. 1 depicts an illustrative embodiment of a system that can be utilized for managing network resources in a wireless communication network. In one or more embodiments, the system 100 can incorporate a subscription-based, mobile communication service into a wireless communication network. In this system 100, an internet protocol multimedia subsystem (IMS) network 155 can be used to route telecommunication services and/or data services for mobile communication devices 116, such as wireless smart phones, using cellular, long term evolution (LTE), third generation (3G), and/or fourth generation (4G) wireless networks. The system 100 can include a network of cellular base stations 117 that provide radio frequency (RF) communication links between wireless communication servers 135 and mobile communication devices 116. The mobile communication devices 116 can perform two-way telephonic communications, as well as two-way data communications, through the IMS network 155 by way of these RF communication links. The mobile communication devices 116 can access public internet protocol (IP) networks 165, which can, in turn, deliver content to the mobile communication devices 116 through the cellular base stations 117. The system 100 can support wireless communications with vehicle-based, mobile communication devices 118 and stationary, wireless communication devices 120, such as Internet of Things (IoT) meters and/or sensors, and other wireless devices.

In one or more embodiments, the system 100 can provide wireless communication services for a variety of devices 116, 118, and 120, each having its own device and usage characteristics that make differing demands on resources of the system 100. Each of the different devices types can require a different radio access technology (RAT), a level of bandwidth, and/or latency. In one example, a stationary wireless device 120, such as a smart utility metering device, can generally require transmission of a relatively small package of data from the stationary wireless device 120 to a logging application that is accessed at the IP network 165 via the IMS network 155. Further, the metering data can be reported from the stationary wireless device 120 at predictable intervals in time. The stationary wireless device 120 can be supported using relatively slow protocols, long latency, low bandwidth, and, in some cases, older RAT resources at the mobility base stations 117. However, it is anticipated that applications of stationary wireless devices 120, such as meters, appliances, lighting installations, irrigation installations, and a potentially a myriad of other IoT devices, could grow to an enormous number of connect devices. Therefore, while the RAN and RAT resources necessary for supporting any given stationary wireless device 120 can be relatively small, the aggregated demand of a large number of such devices can be quite large.

In one example, a vehicle-based wireless device 118 can include a cellular mobility system embedded with a vehicle. The vehicle-based wireless device 118 can provide various services to the vehicle, including entertainment, navigation, access to the IP network 165, and/or wireless telephone communications via the IMS network 155. In contrast to the stationary wireless device 120, the vehicle-based wireless device 118 can require sophisticated 5G routing, very low latency, and, at times, high bandwidth. The resulting demand on RAN resources due to vehicle-based wireless devices 118 can be relatively large when compared to stationary wireless devices 120. However, due to the low latency required in certain applications at the vehicle-based wireless devices 118, communications may only be routed to dedicated servers within the wireless communication system, or LTE 135, using, for example, peer-to-peer communications. Therefore, communications with the vehicle-based wireless devices 118 may be truncated within the LTE system 135 rather than extending into the IP network 165, as would be the case for reporting meter readings from a stationary wireless device 120 to a third-party server. As a result, the RAN resources for supporting vehicle-based wireless devices 118 can be significantly different from those needed for supporting stationary wireless devices 120. A similar analysis can be performed for other mobile communication device 116 and can reveal yet another set of characteristics and demands upon the system 100 and the RAN resources. In real-time, the nature of the demands for wireless communication services in support of mobile communication devices 116, vehicle-based wireless devices 118, stationary wireless devices 120, and/or other wireless devices can vary between cellular base stations 117 and can vary over time. Allocations of RAN resources for any given cellular base station 117 and LTE system 135 supporting control and user paths for connected devices 116-120 can be well matched to the actual communication service needs of these devices 116-120 at a first time period but ill matched at a second time period. Various factors, including movement of mobile communication devices 116 and vehicle-based wireless devices 118, addition/subtraction and/or software maintenance/upgrades of stationary wireless devices 120, fluctuations in user demands, and the like, can cause performance of a local cellular base station 117 to substantially degrade as the required services diverge from the allocation (or slicing) of RAN resources.

Figure 2:
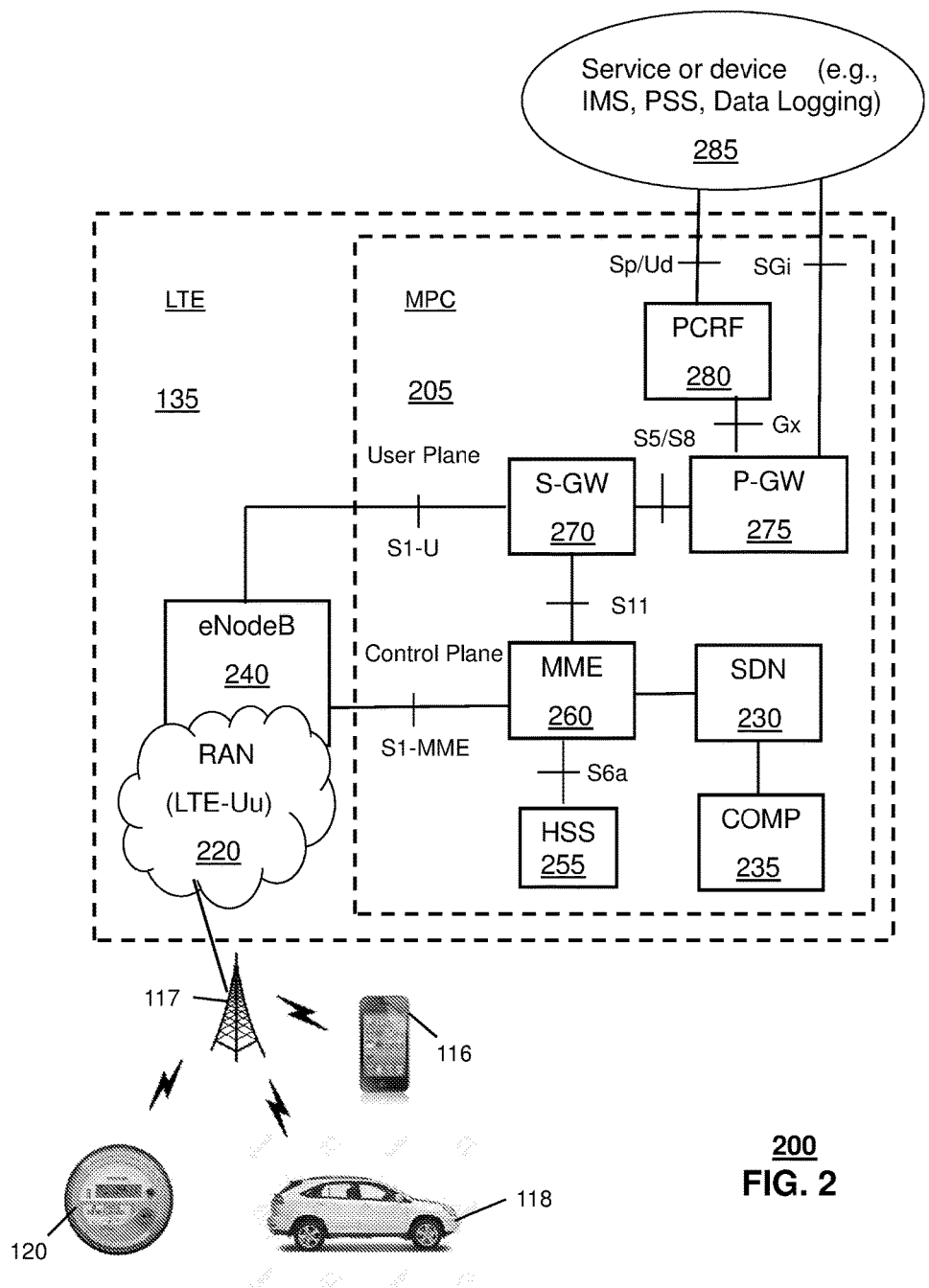
FIG. 2 depicts an illustrative embodiment of a long term evolution (LTE) architecture that can be utilized for managing radio access network (RAN) resources.

FIG. 2 depicts an illustrative embodiment of a long term evolution (LTE) server 135 architecture that can be utilized for managing radio access network (RAN) resources in a communication system 200. In one or more embodiments, the system 200 can include the Long-Term Evolution, or LTE, system 135. The LTE system 135 can include a RAN 220. The RAN can include, for example, an LTE-Uu network 220 that provides radio communication assets for wireless connectivity between the wireless devices 116-120 and the Mobile Packet Core (MPC) 205 of the system 200. The LTE-Uu network 220 can also enable connectivity between the wireless devices 116-120 and the MPC 205. The LTE-Uu network 220 can utilize a number of interfaces, including Iu, Uu, Iub and/or Iur. In one or more embodiments, the LTE-Uu network 220 can include one or more cellular base stations 117, for the transmitting and receiving wireless communication signals to a cell or geographical area. The cellular base station 117 can include physical transmitters, receivers, and antennas for converting between electrical signals and electromagnetic energy signals.

In one or more embodiments, the LTE-Uu network 220 can be coupled to an eNodeB 240 and can carry many traffic types including IP-based packet switched traffic. In one or more embodiments. An E-UTRAN-based LTE-Uu 220 can include one or more eNodeB nodes on the network that are connected to each other such as via X2 interfaces and which are further connectable to the MPC 205 via an S1-U interface. For example, E-UTRAN-based LTE-Uu 220 can use various communication techniques including orthogonal frequency-division multiplexing (OFDM), multiple-input multiple-output (MIMO) antenna technology depending on the capabilities of the terminal, and beam forming for downlink to support more users, higher data rates and lower processing power required on each handset.

In one or more embodiments, an eNodeB 240 can include an air interface to the LTE-Uu network 220 and network interfaces to the MPC 205. The air interface can support an E-UTRAN-based LTE-Uu network 220, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface can enable the eNodeB 240 to receive requests for connection to the system 100 from various types of UE devices, including mobile communication devices 116, vehicle-based wireless devices 118, and stationary wireless devices 120.

In one or more embodiments, the eNodeB 240 can receive a connection request from a mobile communication device 116 or another wireless device. The eNodeB 240 can perform operations consistent with the 3GPP standard. In one or more embodiments, the eNodeB 240 can request authentication for the mobile communication device 116. In one embodiment, the eNodeB 240 can forward a connection request from the mobile communication device 116 to the MME 160. An authentication request can be completed as a control plan function for the mobile communication device 116. The authentication request can be flow from the mobile communication device 116 to the MME 260 via a Non-Access Stratum (NAS) protocol message. The NAS protocol extends from the mobile communication device 116 to the MME 260. The eNodeB 240 allows the NAS protocol authentication request to flow directly from the mobile communication device 116 to the MME 260, via a tunneling protocol (GTP) link between eNodeB 240 and the MME 260. At the MME 260, however, authentication request can be converted to an Internet Engineering Task Force (IETF) standard authentication message protocol, such as the Diamond protocol. The converted, authentication message in the Diamond protocol can be forwarded to the Home Subscription Service (HSS) server 255 for verification of the authentication request for the mobile communication device 116. Hence, the eNodeB 240 can merely forward an authentication request from a mobile communication device 116, whereas the MME 260 can be tasked to convert the authentication request before sending the request to the HSS server 255 and re-convert the results returned from the HSS server 255. The MME 260 can handle conversion to the authentication request and interfacing to the HSS server 255 via a tunneling protocol. In one embodiment, when a mobile communication device 116 is booted up, the mobile communication device 116 can send the authentication request to the MME 260 via eNodeB 240.

In one or more embodiments consistent with the 3GPP standard, the Home Subscriber Server (HSS) 255 can be provide a central database that contains user-related and subscription-related information. The functions of the HSS 255 can include functionalities such as mobility management, call and session establishment support, user authentication and access authorization. In one embodiment, the HSS 255 can manage subscription-related information in real time, for multi-access and multi-domain offerings in an all-IP environment. The HSS 255 can be based on Home Location Register (HLR) and Authentication Center (AuC).

In one or more embodiments consistent with the 3GPP standard, where the HSS 255 returns a successful authentication of the mobile communication device 116, the MME 260 can perform additional control plane functions for the benefit of the mobile communication device 116. In one embodiment, the MME 260 can assign one or more bearer gateways 270 and 275 for use in transporting user data to and from the mobile communication device 116. For example, the MME 260 can assign one or more default bearer gateways 270 and 275 and/or one or more dedicated bearer gateways 270 and 275. In one embodiment, a default bearer gateway 270 and 275 can provide a default pathway for control and signal messages between the mobile communication device 116 and the MPC related to operation of the mobile communication device 116 and the MPC 205. In one embodiment, a dedicated bearer gateway 270 and 275 can provide a pathway for critical signals, such as voice over internet (VoIP), where a guaranteed quality of service (QOS) must be provided. Hence, the MME 260 can perform assignment, creation, deletion, and/or maintenance of bearer gateways 270 and 275 for the mobile communication device 116.

In one or more embodiments consistent with the 3GPP standard, after the MME 260 has performed assignment of bearer gateways 270 and 275 for the mobile communication device 116, the MME 260 can further perform updates and handovers on behalf of the mobile communication device 116 as the mobile communication device 116 moves between various LTE-Uu wireless network 220 locations. The MME 260 can assign initial bearer gateways 270 and 275 for the mobile communication device 116 based on location information and QoS information associated with the mobile communication device 116. However, if the mobile communication device 116 moves to a different location, or if the mobile communication device 116 acquires a different QoS requirement, then the MME 260 can be required to update the assignment of the bearer gateways 270 and 275 to fulfill performance requirements. Hence, the MME 260 can assign and maintain bearer pathways for user data for the mobile communication device 116. In one or more embodiments, the eNodeB 240 supports a tunneling protocol pathway for authentication, control plane, and user plane for the mobile communication device 116.

In one or more embodiments consistent with the 3GPP standard, the MME 260 can perform functions such as idle mode tracking and paging procedure including retransmissions. The MME 260 can also choose a serving gateway for the mobile communication device 116 such as at the initial attach and at time of intra-LTE handover involving node relocation. The MME 260 and HHS 255 can be accessed when the mobile communication device 116 attempts to re-register to user E-UTRAN 220 to access the core network 205. In one embodiment, after the eNodeB 240 and the MME 260 have established a tunneling link for the mobile UE device 210, the session can be maintained indefinitely.

In one or more embodiments according to the 3GPP standard, a Serving Gateway (S-GW) 270 can route and forward user data packets, while also acting as the mobility anchor for the user plane during inter-eNodeB handovers and as the anchor for mobility between LTE and other 3GPP technologies (e.g., terminating S4 interface and relaying the traffic between 2G/3G systems and P-GW 275). For a mobile communication device 116 in idle state, the S-GW 270 can terminate a downlink data path and can trigger paging when downlink data arrives for the mobile communication device 116. The S-GW 270 can manage and can store mobile communication device 116 contexts, such as parameters of an IP bearer service and/or network internal routing information.

In one or more embodiments consistent with the 3GPP standard, a PDN Gateway (P-GW) 275 can provide connectivity from the mobile communication device 116 to external packet data networks by being the point of exit and entry of traffic for the mobile communication device 116. The mobile communication device 116 can have simultaneous connectivity with more than one P-GW 275 for accessing multiple PDNs. The P-GW 275 can perform policy enforcement, packet filtering for each user, charging support, lawful interception and/or packet screening. The P-GW 275 can also act as the anchor for mobility between 3GPP and non-3GPP technologies such as WiMAX and 3GPP2 (CDMA 1x and EvDO).

In one or more embodiments consistent with the 3GPP standard, a Policy Control Resource Function (PCRF) 280 can be provided. For example, the PCRF 280 can be a software node designated in real-time to determine policy rules. As a policy tool, the PCRF 280 can operate at the network core and can access subscriber databases and other specialized functions, such as a charging system, in a centralized manner. The PCRF 280 can aggregate information to and from the network, operational support systems, and other sources (such as portals) in real time, supporting the creation of rules and then automatically making policy decisions for each subscriber active on the network. The PCRF 280 can provide a network agnostic solution (e.g., wire line and/or wireless) and can be integrated with different platforms like billing, rating, charging, and subscriber database or can also be deployed as a standalone entity. The functions performed by the PCRF 280 can be any variety of functions, such as computer implemented steps in a process or algorithm associated with operation of a mobile communications network. System 200 can enable wireless communication services over a number of different networks, such as between a mobile communication device 116 and other communication devices and/or services 285.

In one or more embodiments, the MPC 205 and/or the LTE system 135 can include a software-defined networking, or SDN, controller 230. The SDN controller 230 can monitor and dynamically control manage network resources of the radio access network (RAN) of the LTE system 135. In one or more embodiments, the SDN controller 230 can be an application of a general-purpose SDN that is configured for managing flow control for RAN resources. The SDN controller 130 can facilitate intelligent slicing of RAN resource capabilities for wireless access resources that provide Wi-Fi, LTE, and/or 5G services. The SND controller 130 can provide slicing on a range granularities, ranging from system-wide, area-wide, or cell-wide basis. The slicing of resources can be made according to a variety of criteria, including service provider-specified criteria. The SDN can configure and reconfigure the RAN resources associated with a cellular base station 117 in real time.

Figure 3:
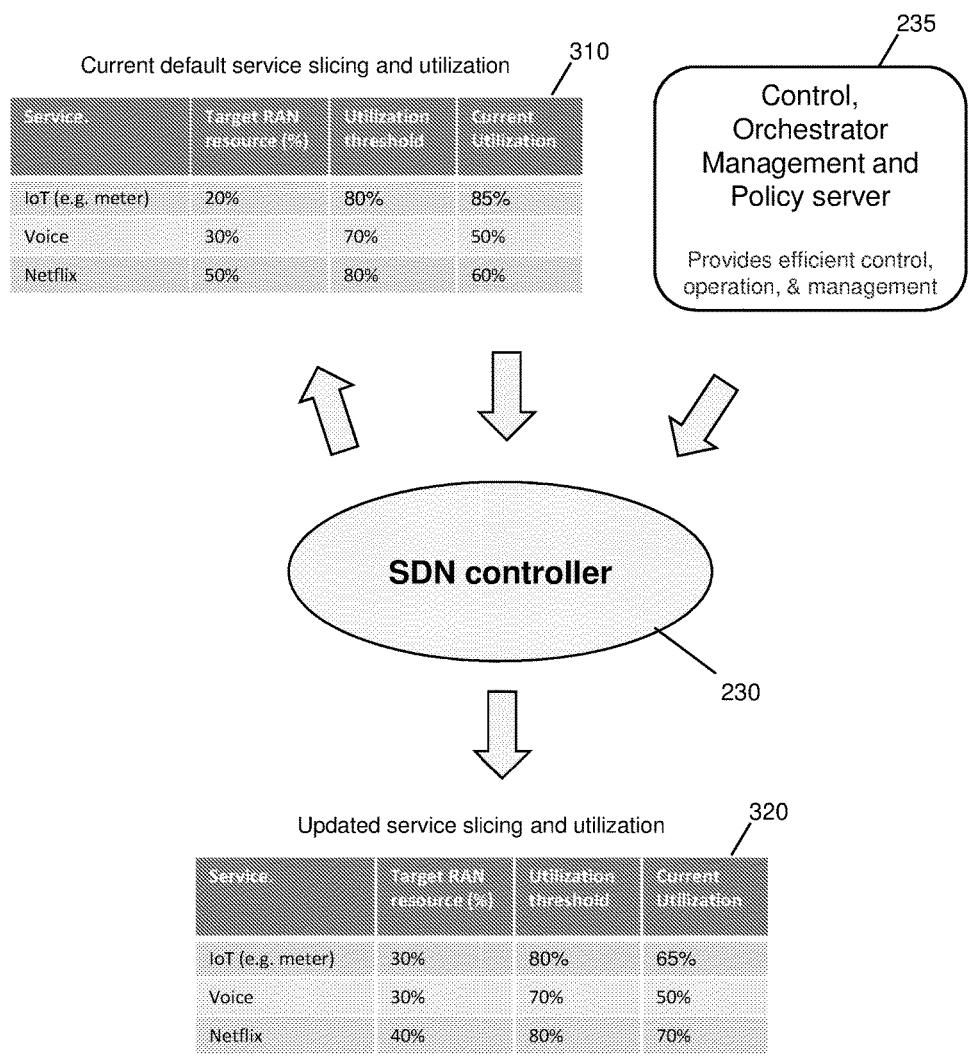
FIG. 3 depicts an illustrative embodiment of using software-defined networking (SDN) for managing RAN slicing.

In one or more embodiments, LTE system 135 and/or the MPC 205 can include a control, orchestrator, management and policy (COMP) server 235. The COMP server 235 can provide policies governing slicing, or allocation, between different services, prioritization of services, resource margins, and initial or default configurations of resources. In one embodiment, the COMP server 235 can be incorporated into the SDN controller 230. The SDN controller 230 can request initial or default configuration information from the COMP server 235. The configuration information can, for example, describe baseline resource slicing for allocating the resources of the RAN 220 for one or more cells of the LTE system 135. The RAN 220 can include the Radio Access Technology, the eNodeB 240, and/or the cellular base station 117 for the one or more cells. The allocating can include identifying specific resources of the RAN 220 that are supporting services for various types of user equipment devices 116-120. In one or more embodiments, the COMP server 235 can provide a default or initial configuration of the RAN resources to the SDN controller 230, as shown in FIG. 3. For example, a default allocation 310 from the COMP server 235 can allocate the RAN resources between three different services—Internet of Things (IoT) devices 120, voice services for mobile communication devices 116 and/or vehicle-based, mobile communication devices 118, and data services (e.g., Netflix™) for mobile communication devices 116 and/or vehicle-based, mobile communication devices 118. The COMP server 235 can provide target percentages of the overall resources, which are assigned for use by each service type. In this case, the COMP server 235 can target 20% for IoT services, 30% for voice services, and 50% for data services.

In one or more embodiments, the SDN controller 230 can convert the targeted allocations of resources from the COMP server 235 into commands for configuring the RAN resources. For example, the SDN controller 230 can communicate with the eNodeB 240, RAN 220, and/or the cellular base station 117, each of which includes resources, such as bandwidth, radio bearers, and/or packet allocations. These RAN resources can be allocated to individual user devices that that are coupled to the LTE system 135. The SDN controller 230 can determine how to configure these resources for the eNodeB 240, the RAN 220, and the cellular base station based on the targeted allocation resources from the COMP and based on the anticipated number of user devices 116-120 of the different types. The SDN controller 230 can thereby generate a configuration the RAN resources in such as to provide services to a set of user device 116-120, which corresponded to an allocation mix of 20%, 30%, and 50% for IoT, voice, and data services, respectively. The SDN controller 230 can then send the desired configurations to the cellular base station 117, the RAN 220, and/or the eNodeB 240 so that the resources are configured to provide services according to the default allocation of the COMP server 235.

In one or more embodiments, the COMP server 235 can provide thresholds for the utilizations of the services that are allocated for to the RAN resources. The actual way in which the RAN resources are used by user devices 116-120 depends on user demand. At any given time, usage of a particular service type may be higher or lower than anticipated. The utilization thresholds can provide trip points, which are used by the SDN controller 230 to determine if the actual usages are or are not near to the capacity of the resources that have been allocated. For example, the COMP server 235 set the utilization threshold for the IoT services at 80%, which would provide a trip point for indicating when 80% of the RAN resources that have been allocated for IoT services are, in fact, being used for these services.

In one or more embodiments, the SDN controller 230 can request capacity and utilization information from the cellular base station 117, the RAN 220, and/or the eNodeB 240. In one embodiment, the SDN controller 230 can request and/or the cellular base station 117, the RAN 220, and/or the eNodeB 240 can report resource capacity and/or utilization information on a periodic basis. The SDN controller 230 can determine current utilization of the RAN resources from the capacity and utilization information that is reported. In one example, the SDN controller 230 determine the current utilization by comparing reported capacities that are available to the capacities that were allocated. In one example, the cellular base station 117, the RAN 220, and/or the eNodeB 240 can directly report current utilizations. In one example, the current utilization of resources allocated for IoT services is 85%, while the utilization threshold that is established by the COMP is 80%.

In one or more embodiments, the SDN controller can compare one or more current utilizations of allocated services to one or more utilization thresholds. For example, the COMP server 235 can provide utilization thresholds of 80%, 70%, and 80% for the IoT services, voice services, and data services, respectively. The SDN controller 230 can access the capacity and utilization information and can determine, for example, that the current utilizations of services are 85%, 50%, and 60%, for the IoT services, voice services, and data services, respectively. In this case, the SDN controller can determine that, at the current time, the IoT services are over utilized, while the voice and data services are underutilized, when compared to the anticipated utilizations. In one or more embodiments, the SDN can use the real-time service utilizations and the utilization thresholds to analyze the operation of the LTE system 135 with respect to its allocation of the RAN resources.

In one or more embodiments, the SDN controller 230 can determine that one or more of the service types is utilizing resources above its utilization threshold, while one or more of the service types is utilizing resources below its utilization threshold. The SDN controller 230 can then determine to reallocate (or resliced) the RAN resources from an underutilized resource to an over utilized resource. In the example case, resources that have been allocated by the COMP server 235 for supporting voice and data services, which are underutilized with respect to the their utilization thresholds, can be reallocated for providing additional capacity for IoT services. The SDN controller 230 can determine the reallocation and, in turn, generate configuration settings for reconfiguring the cellular base station 117, the RAN 220, and/or the eNodeB 240 to conform to the reallocation. For example, the SDN can reallocate RAN resources to increase the IoT service capacity from 20% to 30%, while decreasing the data services capacity from 50% to 40%. In one or more embodiments, the SDN controller 230 can dynamically adjust the RAN resource allocation, potentially following the periodic assessment of each current capacity and services utilizations.

In one or more embodiments, the SDN controller 230 can filter the utilization threshold information prior to using it to determine reallocations. For example, the SDN controller 230 can collect a utilization data over several time periods and can filter the data to remove outliers and/or to provide average or moving average statistics. The SDN controller 230 can use the statistical data to base reallocation decisions on filtered data, so that the reallocation decisions are based on data trends rather than momentary variations (e.g., noise).

In one or more embodiments, the COMP server 235 can provide the SDN controller with priorities for selecting which services, if any, the SDN controller 230 must maintain current RAN resources levels, may shift RAN resources from in order increase resources at a different service, and so forth. The COMP server 235 can provide priorities between services. Returning to the example, the voice and data services are both underutilized. However, the SDN controller 230 increase the capacity for providing IoT service by reducing the RAN resources that are available for providing data services (from 50% to 40% of resources), while maintaining the RAN resources allocated for voice services. In this case, the COMP server 235 may have provided the SDN controller with priority information that forbid reducing the RAN resources dedicated to voice service below a level of 30%. Alternatively, the COMP server 235 may have instructed the SDN controller 230 to prefer allocation of resources for voice services over allocation of resources for data services.

In one or more embodiments, the SDN controller 230 can report the new RAN resource allocations to the COMP server 235. The COMP server 235 can, in turn, save the allocations, which can become the new default allocations. In one or more embodiments, the SDN controller 230 can report the new allocations to an operations support system (OSS), for tracking, further analytics, record keeping, and/or billing based on the allocations.

In one or more embodiments, the SDN controller 230 can collect usage information over time to develop an historic pattern of utilization of services and/or RNA resources. The SDN controller 230 can use historic utilization information to identify time periods (e.g., certain hours, days, weeks, months) when service utilization is significantly higher or lower. The SDN controller 230 can use the historical pattern information to predict future time periods of significantly higher or lower utilization. For example, the collected data may point to an inflection point, where each weekday at 7 am, the demand for voice service jumps by 10% but then drops back to a more typical level at around 10 am. The SDN controller 230 can use this identification as a basis for performing a proactive reallocation of RAN resources, just prior to 7 am each weekday, in order to focus additional resources for voice services at the times and places where this will be most helpful for users by avoiding even temporary scarcity of voice services resources for the system 100. The SDN controller can reallocate the resources away from voice services just after 10 am each weekday, without waiting for real time utilization information, to thereby make optimum use of resources.

The SDN controller 230 can provide dynamic network allocation of resources for one or more networks (e.g., Wi-Fi, LTE, and 5G). The allocations can be performed at the per cell level or at a combined cell (regional) level. The dynamic allocation can be reactively and/or proactively based on network load conditions, service demands, service requirements, and/or quality of service (QoS). The dynamic network allocation of resources can improve network efficiency, by optimize the utilization of resources, while reducing instances of under-utilization and/or over utilization. The SDN controller 230 can used different priorities for different service types and can increase opportunities for monetizing the resources by freeing up resources for application to premium services where possible.

Figure 4:
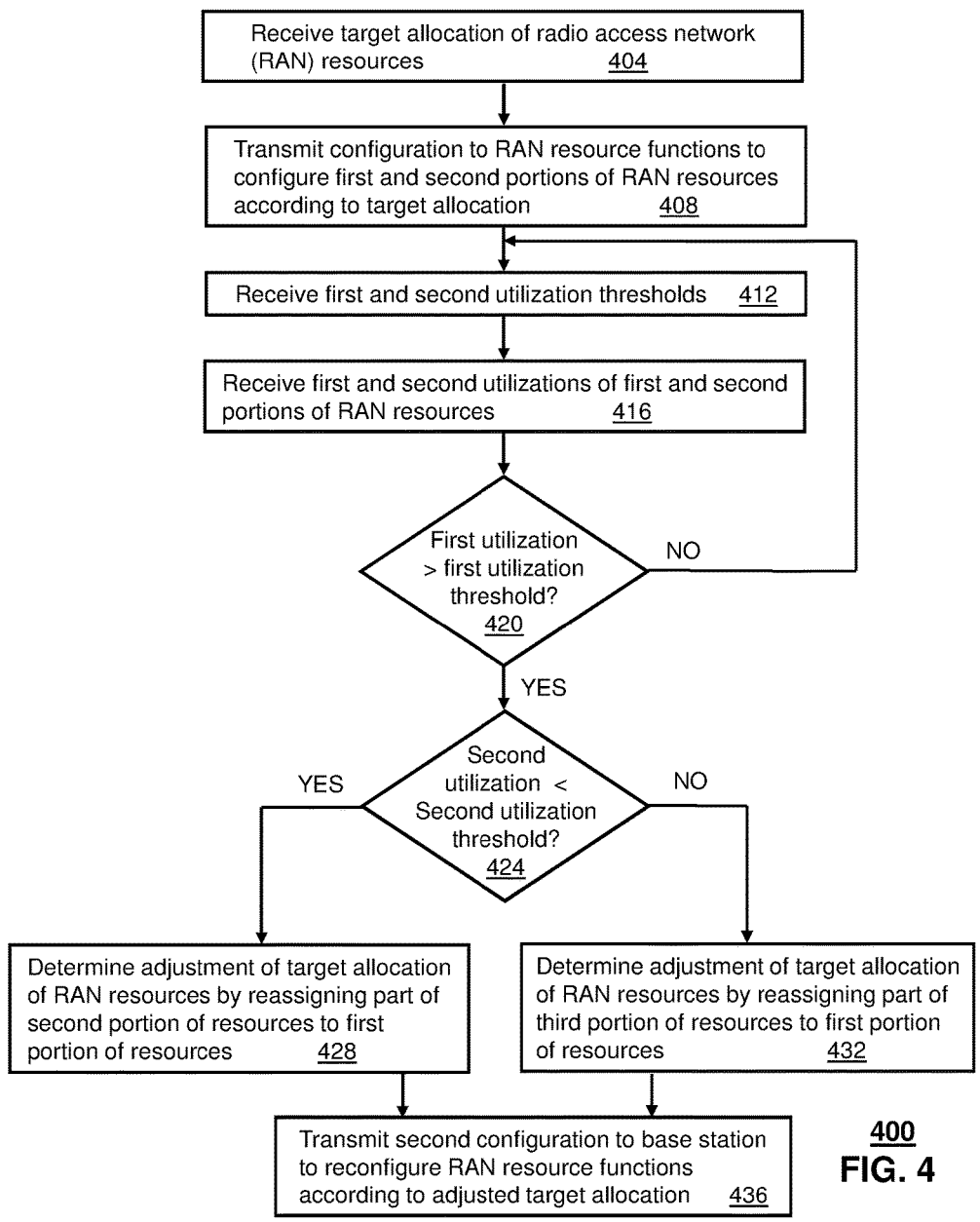
FIG. 4 depicts an illustrative embodiment of a method used in portions of the systems described in FIGS. 1-3.

FIG. 4 depicts an illustrative embodiment of a method used in portions of the systems described in FIGS. 1-3. In one or more embodiments, method 400 is used by the system 100 for dynamically allocating RAN resources. In step 404, the SDN controller 230 can receive a target allocation of resources of a RAN 220. The target allocation of resources can be received from a COMP server 235. The COMP server 235 can provide default slicing, or allocation, of resources to meet anticipated service needs. The allocating can include identifying specific resources of the RAN 220 that are supporting services for various types of user equipment devices 116-120.

In step 408, the SDN controller 230 can transmit a configuration to RAN resource functions to configure the first and second portions of the resources according to the target allocation. The SDN controller 230 can communicate with the eNodeB 240, RAN 220, and/or the cellular base station 117, each of which includes resources, such as bandwidth, radio bearers, and/or packet allocations. The SDN controller 230 can determine how to configure these resources and can generate a configuration the RAN resources in such as to provide services to a set of user device 116-120.

In step 412, the SDN controller 230 can receive first and second utilization thresholds from the COMP server 235. The COMP server 235 can provide thresholds for the utilizations of the services that are allocated for to the RAN resources. The utilization thresholds can provide trip points, which are used by the SDN controller 230 to determine if the actual usages are or are not near to the capacity of the resources that have been allocated.

In step 416, the SDN controller 230 can receive first and second utilizations of the first and second portions of the resources as allocated. The SDN controller 230 can request capacity and utilization information from the cellular base station 117, the RAN 220, and/or the eNodeB 240. The SDN controller 230 can determine current utilization of the RAN resources from the capacity and utilization information that is reported. In step 420, the SDN controller 230 can determine whether the first utilization exceeds the first threshold. If the first utilization (which can be ether utilization) does not exceed the threshold, then the SDN controller 230 can continue monitoring the utilizations. If the first utilization does exceed the first utilization threshold, then the SDN controller 230 can determine if the second utilization exceeds the second utilization threshold, in step 424. If the second utilization exceeds the second threshold, then, in step 432, the SDN controller 230 can determine an adjustment of the target allocation of the resources by reassigning a part of a third portion of the resources to the first portion of the resources to thereby shift capacity from a third allocation to the first allocation. If the second utilization is less than the second utilization threshold, then, in step 428, the SDN controller 230 can determine an adjustment of the target allocation of the resources by reassigning a part of the second portion of the resources to the first portion of the resources to thereby shift capacity from the second portion of the resources to the first portion of the resources. In step 436, the SDN controller 230 can transmit a second configuration to the RAN functions to reconfigure the RAN functions according to the adjusted target allocation.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
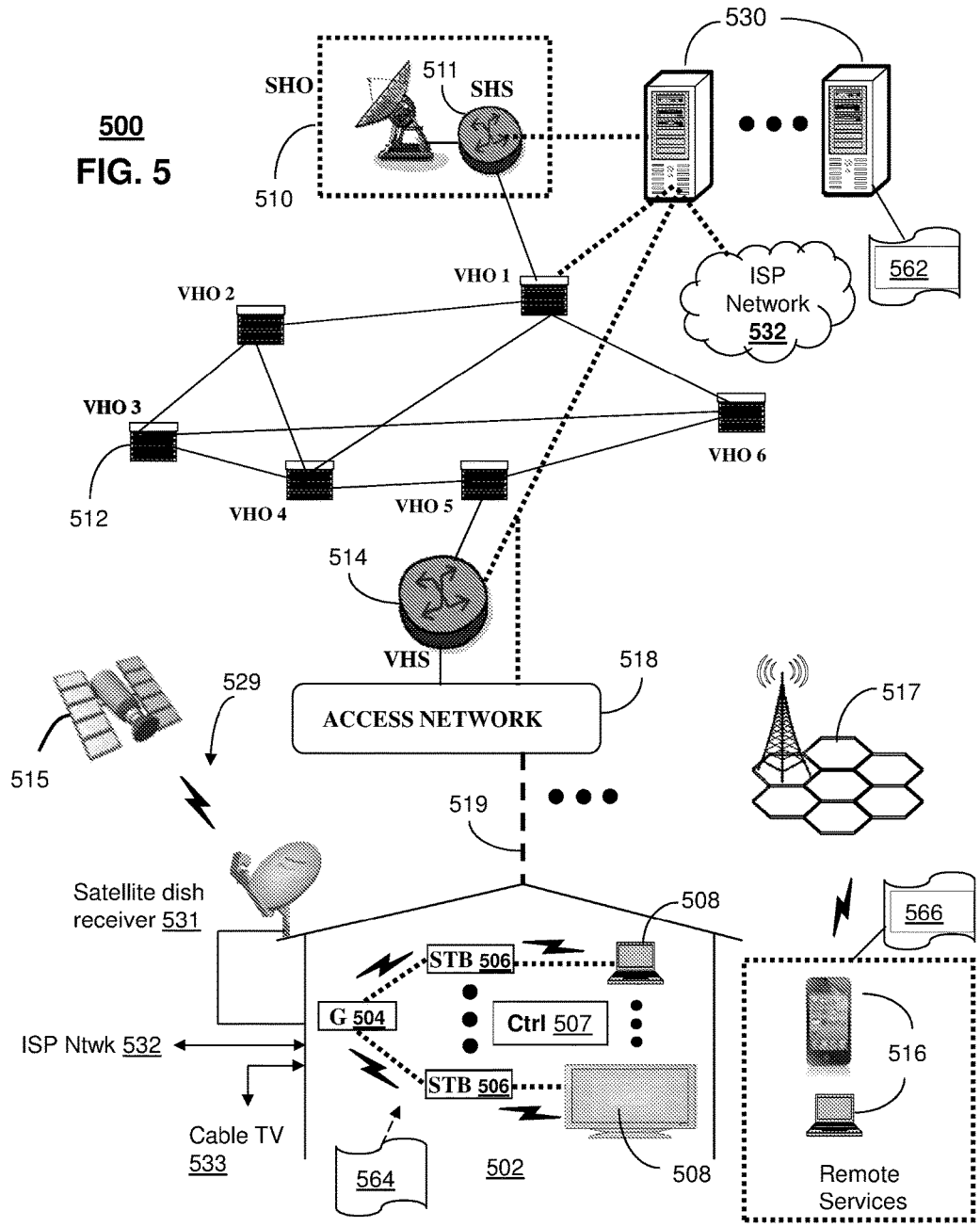
FIGS. 5-6 depict illustrative embodiments of communication systems that provide media services for use by the communication systems of FIGS. 1-3.

FIG. 5 depicts an illustrative embodiment of a first communication system 400 for delivering media content. The communication system 500 can represent an Internet Protocol Television (IPTV) media system. Communication system 500 can be overlaid or operably coupled with the systems 100-300 of FIGS. 1-3 as another representative embodiment of communication system 500. For instance, one or more devices illustrated in the communication system 500 of FIG. 5 for dynamically reallocating resources in a RAN that are used for providing services to user devices via the system.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 408 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a SDN controller 230 (herein called a server). The server 530 can use computing and communication technology to perform function 562, which can include among other things, the techniques described by method 400 of FIG. 400. For instance, function 562 of server 530 can be similar to the functions described for servers 230 of FIGS. 2-3 in accordance with method 400. The media processors 506 and wireless communication devices 516 can be provisioned with software functions 564 and 566, respectively, to utilize the services of server 530. For instance, functions 564 and 566 of media processors 506 and wireless communication devices 516 can be similar to the functions described for the communication devices 116-120 of FIGS. 1-2 in accordance with method 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
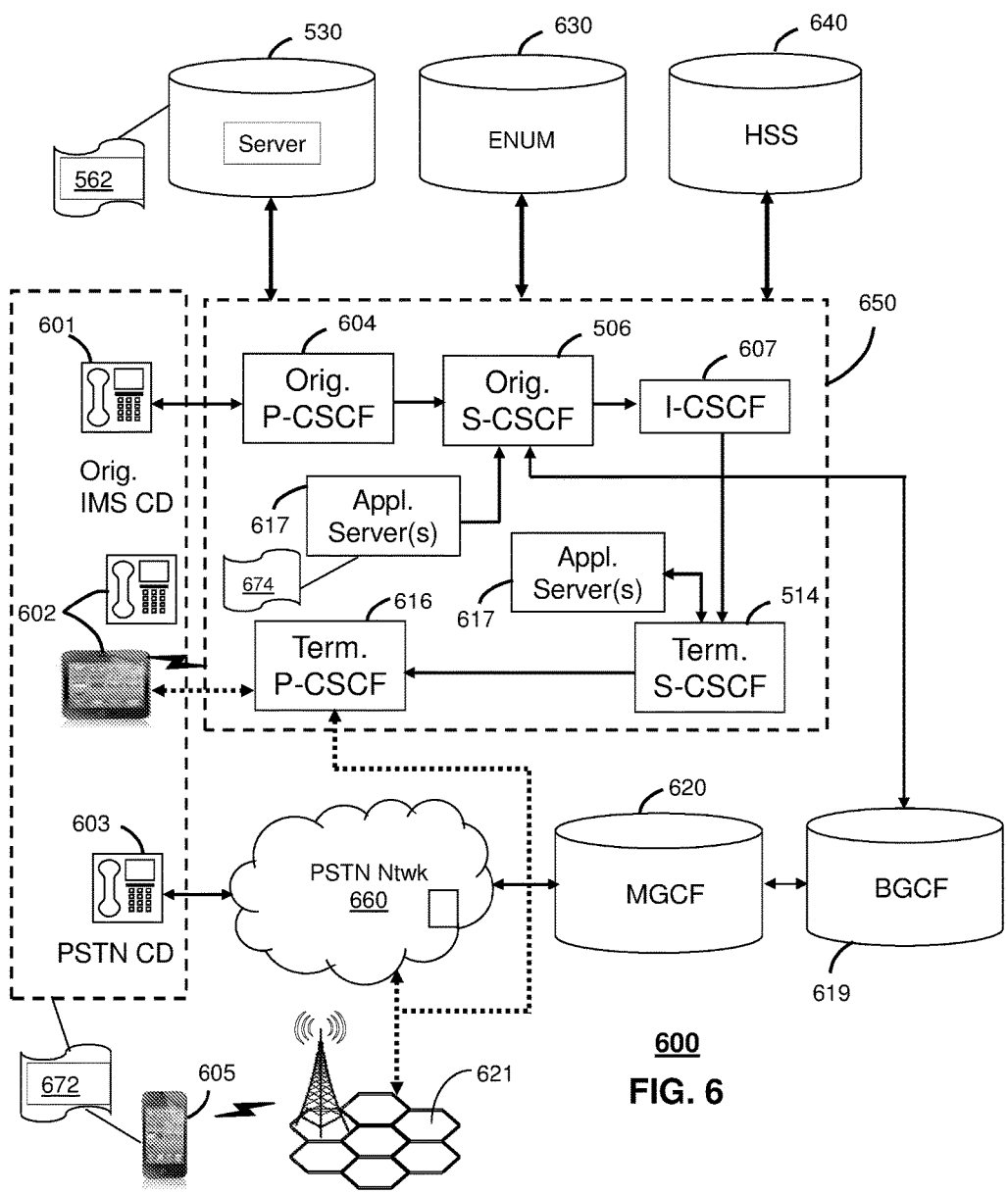

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with systems 100-300 of FIGS. 1-3 and communication system 500 as another representative embodiment of communication system 500 for dynamically reallocating resources in a RAN that are used for providing services to user devices via the system. Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 606, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (ASs) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 607 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 530 of FIG. 5 can be operably coupled to communication system 600 for purposes similar to those described above. Server 530 can perform function 562 and thereby support resource allocations for providing services to the CDs 601, 602, 603 and 605 of FIG. 6 similar to the functions described for the SDN server 230 of FIGS. 2-3 in accordance with method 400 of FIG. 4. CDs 601, 602, 603 and 605, which can be adapted with software to perform function 672 to utilize the services of the server 530 similar to the functions described for communication devices 116-120 of FIGS. 1-2 in accordance with method X400 of FIG. 4. Server 530 can be an integral part of the application server(s) 617 performing function 674, which can be substantially similar to function 564 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
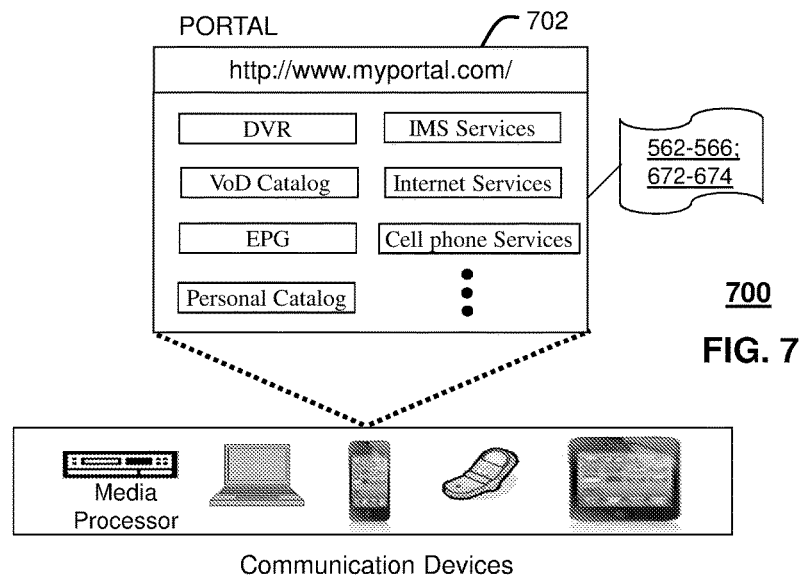
FIG. 7 depicts an illustrative embodiment of a web portal for interacting with the communication systems of FIGS. 1-3 and 5-6.

FIG. 7 depicts an illustrative embodiment of a web portal 702 of a communication system 700. Communication system 700 can be overlaid or operably coupled with systems 100-300 of FIGS. 1-3, communication system 500, and/or communication system 600 as another representative embodiment of systems 100-300 of FIGS. 1-3, communication system 500, and/or communication system 600. The web portal 602 can be used for managing services of systems 100-300 of FIGS. 1-3 and communication systems 500-600. A web page of the web portal 602 can be accessed by a Uniform Resource Locator (URL) with an Internet browser using an Internet-capable communication device such as those described in FIGS. 1-3 and FIGS. 5-6. The web portal 702 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of systems 100-300 of FIGS. 1-3, and communication systems 500 and 600. For instance, users of the services provided by SDN controller 230 or server 530 can log into their on-line accounts and provision the servers 110 or server 430 with user profiles or provide contact information to server 530 to enable it to communication with devices described in FIGS. 1-3, and so on. Service providers can log onto an administrator account to provision, monitor and/or maintain the <systems 100-300 of FIGS. 1-3 or server 530.

Figure 8:
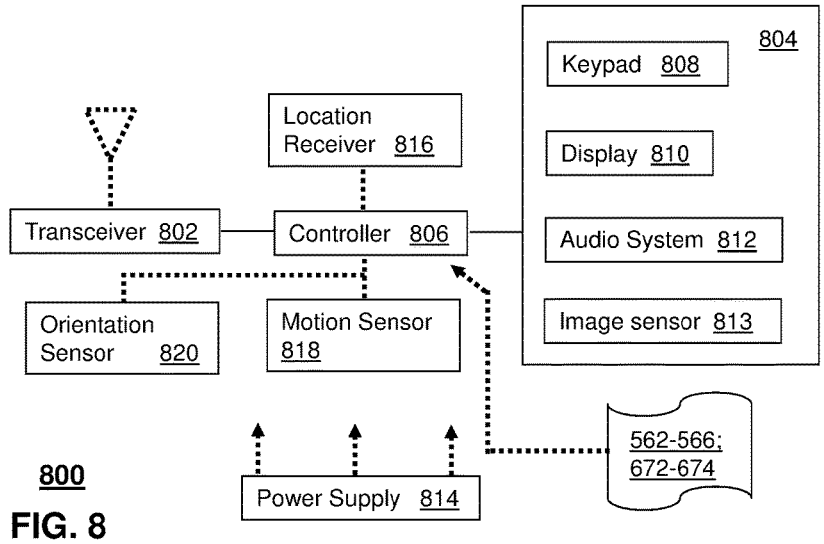
FIG. 8 depicts an illustrative embodiment of a communication device.

FIG. 8 depicts an illustrative embodiment of a communication device 800. Communication device 800 can serve in whole or in part as an illustrative embodiment of the devices depicted in FIGS. 1-3, and FIGS. 5-6 and can be configured to perform portions of method 400 of FIG. 4.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of devices of FIGS. 1-3, the communication devices 115-120 of FIG. 1, as well as the IMS CDs 601-602 and PSTN CDs 603-605 of FIG. 6. It will be appreciated that the communication device 800 can also represent other devices that can operate in systems of FIGS. 1-3, communication systems 500-600 of FIGS. 5-6, such as a gaming console and a media player. In addition, the controller 806 can be adapted in various embodiments to perform the functions 462-466 and 572-574, respectively.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
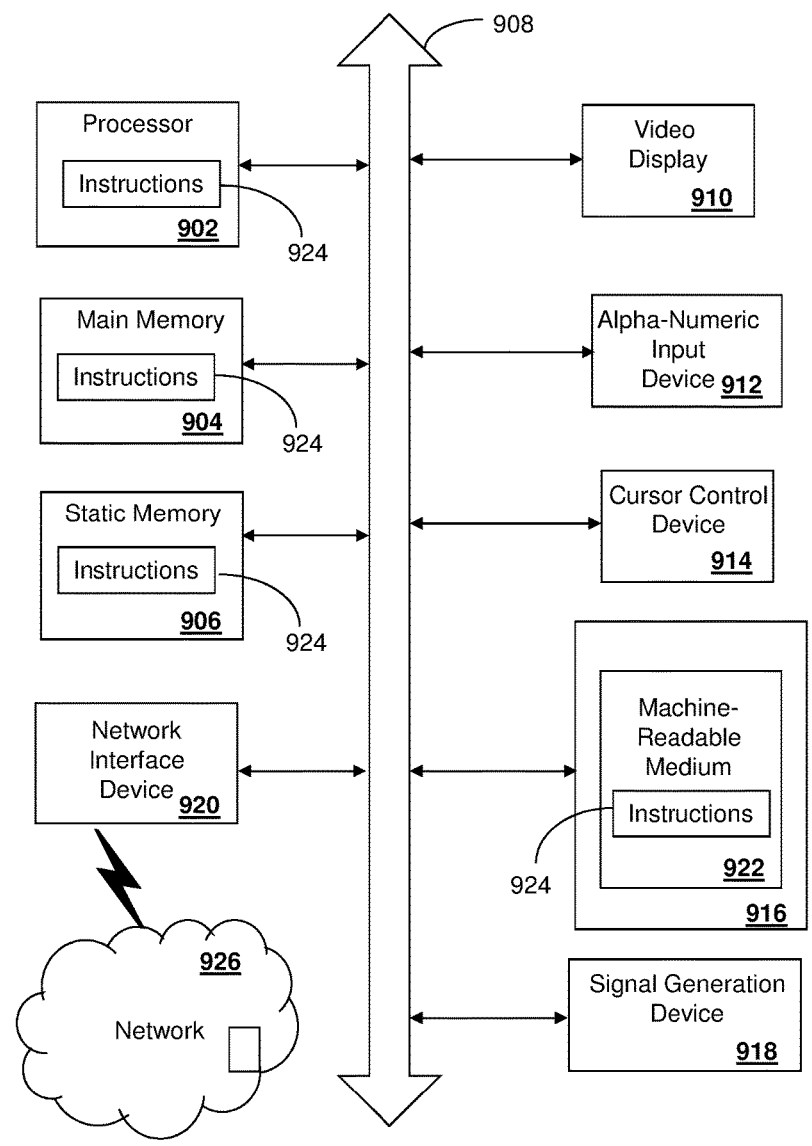
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the server 530, the wireless communication device 116-120, the SDN controller 230, the COMP server 235, and other devices of FIGS. 1-3 In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine.

It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processor, facilitate performance of operations, comprising:
collecting usage information associated with resources of a radio access network of a communication network for providing communication services to generate an historic pattern of utilization of the resources;
determining periodic inflection points in the historic pattern of utilization of the resources;
determining a first target allocation of the resources of the radio access network of the communication network according to the periodic inflection points in the historic pattern of utilization of the resources, wherein the first target allocation assigns a first portion of the resources for providing a first communication service and a second portion of the resources for providing a second communication service;
transmitting first configuration information to the radio access network to configure the resources according to the first target allocation;
receiving from the radio access network a first utilization of the first portion of the resources and a second utilization of the second portion of the resources;
comparing the first utilization to a first utilization threshold responsive to receiving the first utilization from the radio access network;
comparing the second utilization to a second utilization threshold responsive to receiving the second utilization from the radio access network;
determining an adjustment of the first target allocation of the resources according to the comparing of the first utilization to the first utilization threshold and comparing the second utilization to the second utilization threshold, wherein the adjustment comprises reassigning a first part of the second portion of the resources to the first portion of the resources, wherein the reassigning causes the first utilization of the first portion of the resources to fall below the first utilization threshold; and
transmitting second configuration information to the radio access network to reconfigure the radio access network according to the adjustment of the first target allocation of the resources.

2. The device of claim 1, wherein the operations further comprise receiving minimum second portion information from a policy server.

3. The device of claim 2, wherein the first part of the second portion of the resources of the radio access network is reassigned to the first portion according to the minimum second portion information.

4. The device of claim 1, wherein the operations further comprise:
receiving from a policy server the first utilization threshold of the first portion of the resources of the radio access network; and
receiving from the policy server the second utilization threshold of the second portion of the resources of the radio access network.

5. The device of claim 1, wherein the operations further comprise receiving a service priority from a policy server, wherein the adjustment is further determined according to the service priority.

6. The device of claim 1, wherein the operations further comprise receiving a low resource indicator from the radio access network, wherein the adjustment is further determined responsive to receiving the low resource indicator.

7. The device of claim 1, wherein the operations further comprise:
determining a proactive target allocation of the resources according to predictive usage associated with the resources; and
transmitting third configuration information to the radio access network to proactively configure the radio access network according to the proactive target allocation.

8. The device of claim 7, wherein the operations further comprise generating the third configuration information for configuring the radio access network according to the proactive target allocation.

9. The device of claim 7, wherein the operations further comprise:
collecting usage information associated with the resources of the radio access network; and
determining the predictive usage associated with the resources according to the usage information that is collected.

10. A method, comprising:
collecting, by a processing system including a processor, usage information associated with resources of a radio access network of a communication network for providing communication services to generate an historic pattern of utilization of the resources;
determining, by the processing system, periodic inflection points in the historic pattern of utilization of the resources;
determining, by the processing system, a first target allocation of the resources of the radio access network of the communication network according to the periodic inflection points in the historic pattern of utilization of the resources, wherein the first target allocation assigns a first portion of the resources for providing a first communication service and a second portion of the resources for providing a second communication service;
transmitting, by the processing system, first configuration information to the radio access network to configure the radio access network according to the first target allocation;
receiving, by the processing system, from a policy server a first utilization threshold of the first portion of the resources;
receiving, by the processing system, from the radio access network a first utilization of the first portion of the resources;
comparing, by the processing system, the first utilization to the first utilization threshold responsive to receiving the first utilization from the radio access network;
determining, by the processing system, an adjustment of the first target allocation of the resources according to the comparing of the first utilization to the first utilization threshold, wherein the adjustment comprises reassigning a first part of the second portion of the resources to the first portion of the resources; and
transmitting, by the processing system, second configuration information to the radio access network to re-configure the radio access network according to the adjustment of the first target allocation of the resources.

11. The method of claim 10, wherein the reassigning causes the first utilization of the first portion of the resources to fall below the first utilization threshold.

12. The method of claim 10, further comprising:
receiving, from the policy server, by the processing system, a second utilization threshold of the second portion of the resources; and
receiving, from the radio access network, by the processing system, a second utilization of the second portion of the resources.

13. The method of claim 12, further comprising comparing, by the processing system, the second utilization to the second utilization threshold responsive to receiving the second utilization from the resources, wherein the adjustment is further determined according to comparing the second utilization to the second utilization threshold.

14. The method of claim 10, further comprising receiving, by the processing system, minimum second portion information from the policy server, wherein the first part of the second portion of the resources is reassigned according to the minimum second portion information.

15. The method of claim 10, further comprising receiving, by the processing system, a low resource indicator from the radio access network, wherein the adjustment is further determined according to a service priority responsive to the receiving of the low resource indicator.

16. The method of claim 15, further comprising receiving, by the processing system, the service priority from the policy server.

17. The method of claim 10, further comprising:
determining, by the processing system, a proactive target allocation of the resources according to predictive usage associated with the resources; and
transmitting, by the processing system, third configuration information to the radio access network to proactively configure the radio access network according to the proactive target allocation.

18. The method of claim 17, further comprising:
collecting, by the processing system, usage information associated with the resources of the radio access network; and
determining, by the processing system, the predictive usage associated with the resources according to the usage information that is collected.

19. A machine-readable storage medium, comprising executable instructions that, when executed by a processing system including a processor, facilitate performance of operations, comprising:
collecting usage information associated with resources of a radio access network of a communication network for providing communication services to generate an historic pattern of utilization of the resources;
determining periodic inflection points in the historic pattern of utilization of the resources;
determining a first target allocation of the resources of the radio access network of the communication network according to the periodic inflection points in the historic pattern of utilization of the resources, wherein the first target allocation assigns a first portion of the resources for providing a first communication service;

transmitting first configuration information to the radio access network to configure the radio access network according to the first target allocation;

receiving from the radio access network a first utilization of the first portion of the resources;

comparing the first utilization to a first utilization threshold responsive to receiving the first utilization from the radio access network;

determining an adjustment of the first target allocation of the resources according to the comparing of the first utilization to the first utilization threshold; and transmitting second configuration information to the radio access network to re-configure the radio access network according to the adjustment of the first target allocation of the resources.

20. The machine-readable storage medium of claim 19, wherein the operations further comprise receiving, from a policy server, the first utilization threshold of the first portion of the resources.

\* \* \* \* \*